United States Patent [19]

Fisher et al.

[11] Patent Number: 4,600,979

[45] Date of Patent: Jul. 15, 1986

[54] PASSIVE COOLING SYSTEM FOR A LUMINAIRE

[75] Inventors: Kenneth J. Fisher; William R. Miller, both of Erie, Pa.

[73] Assignee: American Sterilizer Company, Erie, Pa.

[21] Appl. No.: 783,303

[22] Filed: Oct. 2, 1985

[51] Int. Cl.[4] .............................................. B60Q 1/06

[52] U.S. Cl. .................................. 362/373; 362/294; 362/345; 362/804

[58] Field of Search ............... 362/373, 294, 345, 804, 362/401, 227, 235

[56] References Cited

U.S. PATENT DOCUMENTS

| | | | |
|---|---|---|---|
| 3,609,335 | 9/1971 | Kelly | 362/804 |
| 3,626,170 | 12/1971 | Schwan | 362/294 |
| 4,037,096 | 7/1977 | Brendgord et al. | 362/294 |
| 4,054,790 | 10/1977 | Slaughter | 362/373 |
| 4,081,023 | 3/1978 | Edelstein et al. | 362/373 |
| 4,288,844 | 9/1981 | Fisher et al. | 362/297 |
| 4,321,656 | 3/1982 | Gruver, Jr. | 362/373 |
| 4,400,765 | 8/1983 | Kochem | 362/804 |
| 4,504,888 | 3/1985 | Rosenthal | 362/373 |

*Primary Examiner*—E. Rollins Cross
*Attorney, Agent, or Firm*—Robert D. Yeager; George D. Dickos

[57] ABSTRACT

Apparatus is provided for removing the heat from within a generally sealed enclosure having a heat generating means disposed therein, such as a surgical light. The enclosure of the light includes a slightly domed top, a generally cylindrical side wall and a round bottom lens. The heat generating means consists of a plurality of lamps located within a cylindrical housing having a closed end which is located within the enclosure in the center of the top thereof. Radial fins extend about the circumference of the heat generating means, certain of the fins having arms extending radially therefrom. A large curved reflector having a series of lower slots forms an annular inner wall between the arms of the fins and the lens adjacent the outer circumference thereof. As such, the heat generated by the lamp housing is passed to the fins and travels to heat the upper ends thereof. This action causes the air adjacent the upper portion of the fins to be heated relative to the air present in the outboard reaches of the enclosure thereby causing airflow from the fins radially outward. The heat from the air is transmitted during such airflow to the top of the cover which then is radiated to the atmosphere. As the air loses its heat it drops to the lower portion of the annular wall and passes through the slots to be reheated by the fins as it passes therebetween to be reintroduced into proximity with the top of the enclosure.

16 Claims, 3 Drawing Figures

Fig. I.

PASSIVE COOLING SYSTEM FOR A LUMINAIRE

BACKGROUND OF THE INVENTION

1. Field of the Invention

The present invention relates to the cooling of an enclosure having a heat source disposed therein and, in particular, to a passive system for accomplishing the internal cooling of a surgical lighthead assembly.

2. Description of the Prior Art

In diverse environments there are found devices, such as lights, in which a heat generating means is contained within a sealed enclosure. It will be readily appreciated that due to the heat produced within such enclosure by the heat generating means, the temperature in the enclosure can quickly rise to levels sufficient to damage the componentry internal to the enclosure.

An example of a device such as described above is a surgical lamp which may comprise a plurality of lamps sealed within an enclosure. An enclosed lighting system employing a plurality of lamps therein generates a large amount of heat within the light fixture. This is especially true of surgical lighting systems where, due to the requirements of the surgical process, most of the heat-producing infrared light must be removed from the generated illumination pattern and is instead radiated into the fixture.

Due to the sterility requirements of various "clean areas", surgical lights should be sealed to the environment. Such sealing is required to prevent contaminants from being drawn over the surgical site by thermal currents particularly when the surgical light is used in close proximity thereto. In addition, these contaminants will deposit on internal optical componentry and degrade reflective and transmissive properties. Overall optical efficiency will then diminish over time.

One prior art method of accomplishing the cooling of a surgical light is shown is U.S. Pat. No. 4,037,096. That patent teaches of the provision of slots in the outer housing thereof sufficient to allow air to circulate into and out of the enclosure to cool the heat generating source and remove the heat to the atmosphere. Unfortunately, as noted above, the provision of slots within the surgical light's outer housing allows dust, bacteria and other contaminants to enter the surgical light which will then be transmitted therefrom to the surgical site when the surgical light is introduced thereinto or foul the optical characteristics of the system. As such, the prior practice of providing cooling slots to allow air flow through the light is clearly inadequate to serve the paramount interests of sterility found in a surgical environment and of lighting efficiency needed to ensure adequate illumination.

Another prior art means of cooling a heat source disposed within an enclosure, such as a surgical light, includes a fan means operative to circulate cooling air past the heat generating source. It is manifest that the provision of such an air circulating fan also requires the installation of vents to allow air flow into and out of the enclosure. From above, such air vents provide access for contaminants to enter the light and to travel to the surgical site. Moreover, the action of the fan will draw higher amounts of contaminants due to its increased flow rates over the surgical site thereby further exacerbating the problems of contamination and interference with the lighting pattern. In addition, the use of a fan in a surgical light adds excessive noise to the surgical theatre and causes the vibration of the light which interferes with overall lighting efficiency.

The subject invention is directed toward an improved means for withdrawing heat from an enclosure having an internal heat generating source which overcomes, among others, the, above-discussed problems and provides a means for passively cooling an enclosure having an enclosed heat source without requiring passages to the atmosphere or a vented fan means.

SUMMARY OF THE INVENTION

In accordance with the present invention, there is provided apparatus for removing heat from an enclosure having a heat generating source disposed therein. By means of example, the enclosure may consist of a surgical light which includes a shallow cylindrical cover having one slightly domed, closed end and a lens or a plurality of lenses for its other end thereby enclosing a light assembly which includes a plurality of individual lamps. The closed end of the cylindrical cover may include an aperture in the center of the cover which is covered by a cover plate. The light assembly is disposed within the cylindrical cover adjacent its closed end under the cover plate. The light assembly is substantially surrounded at the top thereof by the cover plate and by a cylindrical lamp housing which is closed at one end. Hence, the light assembly is substantially enclosed within the lamp housing. In order to improve the removal of heat from the lamp housing, radial fins can be spaced about the lamp housing's cylindrical portion. Certain of the fins are provided with an arm which extends radially toward the cylindrical side portion of the enclosure yet in spaced clearance relation to the closed top end of the enclosure's cover.

In order to direct the flow of heated air within the system, the reflector for the lighting system which directs the generated light from the lighting system consists of a large curved inner annular wall extending about the lamp housing and to the lower outermost portion of the end cover of the enclosure. As such, the upper edge of the inner annular wall is affixed at various points therealong to the radial arms of the lamp housing fins while the lower edge is affixed to the lower end cover adjacent the cylindrical side wall of the enclosure. Slots are provided to allow air to pass from the area between the inner annular wall and top and cylindrical side wall of the enclosure to the area between the annular wall and the lower end cover.

In operation, the heat generated by the various lamps within the lamp housing is transmitted to the radial fins of the lamp housing. While the system provided herein functions most efficiently when in the vertical position, which will be described herein, it is to be understood that the principles of the invention obtain regardless of orientation. The heat is transferred by conduction from the hotter lower portions of the fins to the top portions of the fins. Due to the increasingly large area and, hence, presence of cooler air between the annular wall and the top of the enclosure cover, the heat from the tops of the fins is transmitted to the cooler air within such area. This action causes heated air to move radially outward from the tops of the fins along the top of the enclosure. During this process, the heat contained by the heated air is transmitted to the top cover of the enclosure which allows such heat to be radiated from the large area of the enclosure cover to the cooler surrounding ambient outside the light. As the heat is removed from the air which is present between the annular wall and the top of the enclosure cover, it falls to the area between the lower portion of the cylindrical sidewall and the annular wall. From this point the air is driven through the slots and then is directed toward the heated fins due to the slightly higher pressure caused by the newly heated air being moved into contact with the top of the enclosure cover and filling the outer chamber defined between the enclosure's cover and the outside of the inner annular wall.

Accordingly, the present invention provides solutions to the aforementioned problems associated with the cooling of an enclosure having a heat generating source therein. As this invention provides an effective means of removing heat from the enclosure by the use of a closed system without requiring holes to the atmosphere or fans, the possibility of contaminants entering a clean area or degrading the optics are alleviated.

These and other details, objects and advantages of the invention will become apparent as the following detailed description of the present preferred embodiment thereof proceeds.

BRIEF DESCRIPTION OF THE DRAWINGS

In the accompanying drawings, I have shown a present preferred embodiment of the invention wherein.

DETAILED DESCRIPTION OF THE PREFERRED EMBODIMENTS

Figure 1:
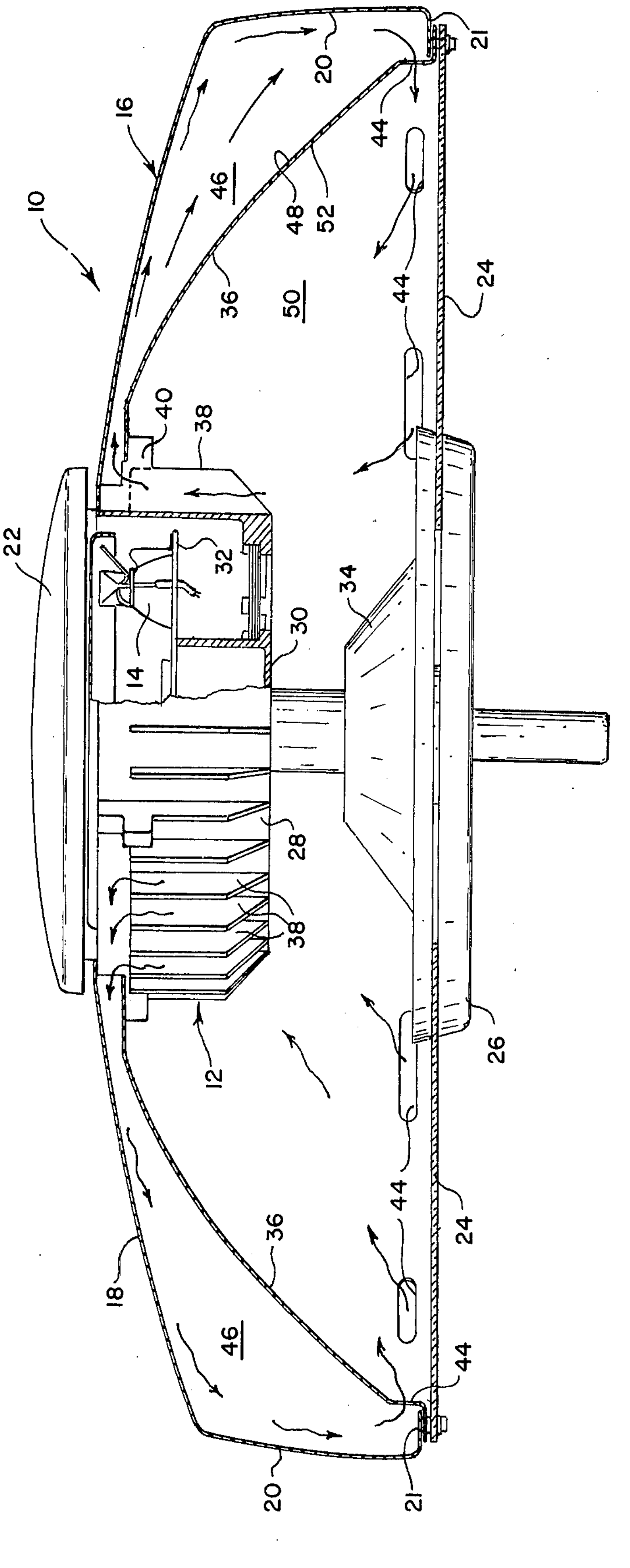
FIG. 1 is a side sectional view of the invention provided herein.
Figure 2:
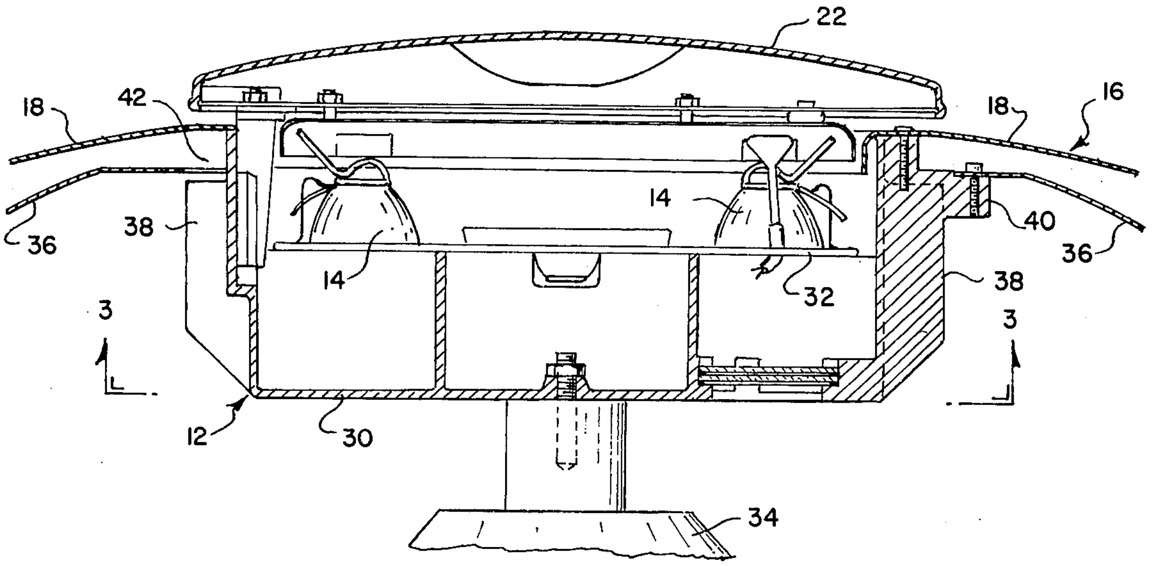
FIG. 2 is a magnified view of a portion of the invention depicted in FIG. 1; and, FIG. 3 is a bottom plan view of a portion of the present invention taken along lines 3—3 in FIG. 2.
Figure 3:
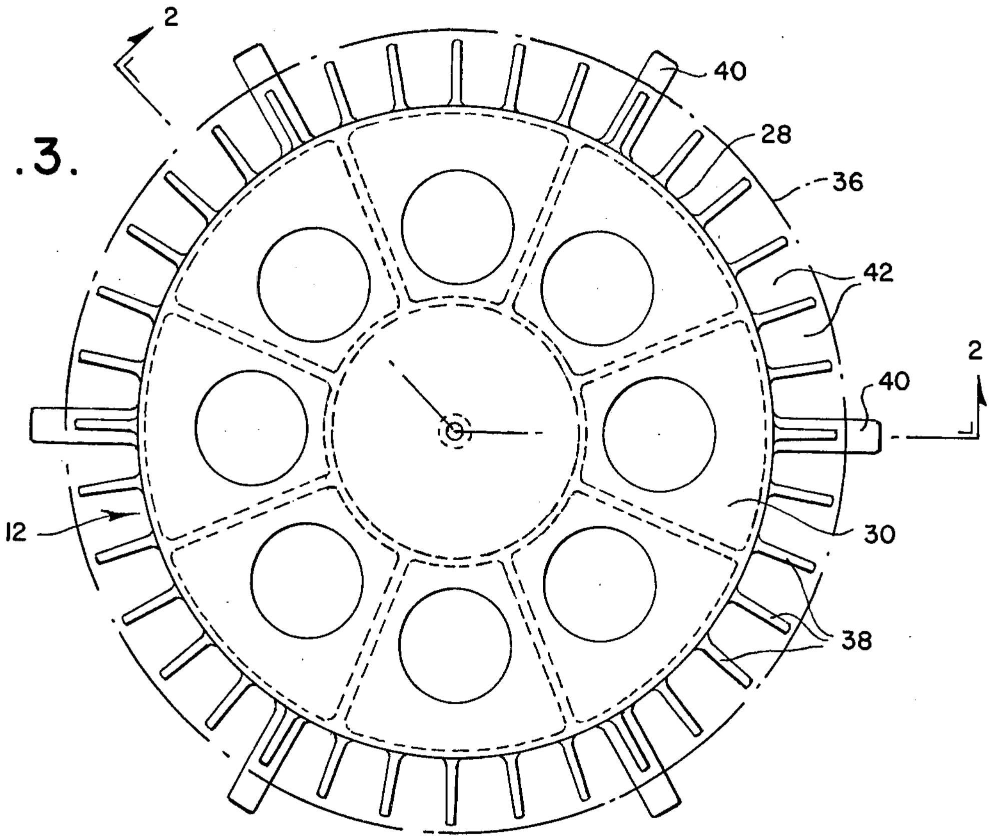

Referring now to the drawings wherein the showings are for purposes of illustrating the present preferred embodiments of the invention only and not for purposes of limiting the same, there is shown an object, generally designated 10, including a surrounding enclosure which has disposed therein a heat generating source, generally designated 12. For purposes of the present DETAILED DESCRIPTION OF THE PREFERRED EMBODIMENTS the enclosed object 10 will be described as a surgical light 10 having a lamp housing 12 disposed therein and containing a plurality of lamps 14 therein which, of course, generate heat.

Light 10 is provided with an outer cover, generally 16, which consists of an annular, slightly domed top portion 18 and a depending side wall 20 which terminates in an inwardly-turned circumferential flange 21. In addition, outer cover 16 includes a lamp cover 22 which covers, but which may not completely seal, the aperture in the center of top portion 18. As such, outer cover 16, generally forms a cylinder having the top end thereof closed by a slight dome. The enclosure of light 10 is completed at the bottom thereof by a flat, annular lens 24 secured to the flange 21 of side wall 20 and an inner cover 26 attached thereto which fills the hole in its annulus. Accordingly, the combination of outer cover 16, lens 24 and inner cover 26 form an enclosure generally sealed from the atmosphere.

In order to describe the system provided for cooling light 10, it is expedient to describe certain portions of the lighting system thereof. Lamp housing 12 consists of a cylindrical can 28 having a round bottom plate 30 attached thereto. Lamp housing 12 is affixed to outer cover 16 adjacent the inner radius of the annulus of top 18 and, hence, depends therefrom. Provided within lamp housing 12 are a plurality of downwardly-facing lamps 14 arranged in a radially spaced arrangement therein and supported by means of a plate 32 which is apertured so as to allow the light from lamps 14 to initially travel downward. The light from lamps 14 is then caused to strike a small reflector 34 which directs the light outward to a large domed reflector 36 which, in turn, directs the light downward through lens 24 to a focal point located some distance therefrom.

In order to remove the heat which is generated within lamp housing 12 therefrom, a plurality of radially-spaced vertical fins 38 are preferably provided about the circumference of can 28. In addition, either some or all of fins 38 have arms 40 which extend radially therefrom toward cylindrical side wall 20. The top portions of arms 40 serve as points of attachment for the top of large reflector 36 which passes around fins 38 but only extends as far inward as the juncture of arms 40 with fins 38. It will be appreciated, however, that any suitable means of supporting the top of large reflector 36 adjacent the radial ends of fins 38 may be provided within the scope of the present invention. The top of large reflector 36 is not intended to extend to can 28 in order that a gap 42 will be provided between the uppermost end of large reflector 36 and can 28 which is bounded by fins 38. Large reflector 36 is then configured to arc downwardly, at a lesser radius of curvature that that of outer cover 16, to a point of attachment adjacent flange 21 of side wall 20. Slots 44 are provided to be circumferentially spaced about the lowermost point of large reflector 36 adjacent the points of attachment of large reflector 36 with flange 21.

The above-described construction thus provides two discrete air chambers. Outer air chamber 46 is formed between the top 18 and side wall 20 of outer cover 16, the outer surface 48 of large reflector 36 and the uppermost portion of can 28. An inner air chamber 50 is formed between the inner surface 52 of large reflector 36, lens 24, inner cover 26 and can 28. As such, slots 44 provide access through which air may pass from the lower portion of outer chamber 46 to the lower portion of inner chamber 50. In addition, a channel is formed between fins 38 and can 28 which directs air upward from inner chamber 50 to outer chamber 46 through passage 42 formed between can 28, fins 38 and the upper edge of large reflector 36. Preferably, passage 42 is sized to optimize the air flow characteristics of the system such as velocity and pressure differential thereacross.

In operation, the heat generated within lamp housing 12 is transmitted from lamps 14 to can 28 and its bottom plate 30 by means of conduction and radiation. Since the fins 38 are extended from can 28 the free ends thereof are cooler than the ends in contact with can 28 which causes the heat to be transmitted by conduction from can 28 to fins 38. In addition, due to the greater concentration of heat in fins 38 at the bottoms thereof due to their proximity to bottom plate 30, the heat in fins 38 flows from the bottoms thereof to the top portions thereof. As such, the tops of fins 38 are caused to become quite heated. This causes the air adjacent the tops of fins 38 to be substantially hotter than that along the inner surface of top 18 of outer cover 16 but located radially outboard of fins 38. This heat differential causes the heated air adjacent fins 38 to travel radially outward to the cooler outboard areas. Due to the increasing distance between the inside surface of top 18 and outer surface 48 of large reflector 36 the air is coolest along top 18 at its furthestmost point from fins 38. This fact causes heated air to be transmitted radially outboard along the inner surface of top 18. During such transport of heated air along the inner surface of top 18, the heat of the air is transmitted by means of convection to top 18 thereby heating it relative to the atmosphere. Due to the heat differential between top 18 and its environment, it radiates heat thereto which eliminates the heat from light 10.

After the air passes along the inner surface of top 18 and loses a significant degree of its heat it has become cooler than the air then in contact with fins 38 which causes hot air to replace it within outer chamber 46 thereby driving the cooler air downward and out of chamber 46 by means of slots 44 and into inner chamber 50. The flow of air into outer chamber 46 causes a slightly higher pressure therein forcing additional air from outer chamber 46 to inner chamber 50. The cooler air at the bottom of inner chamber 50 is then driven upward into contact with fins 38 and eventually to passage 42 thereby reinitiating the complete cycle.

Accordingly, the present invention provides a passive means of cooling the light 10 without requiring apertures to the environment or the utilization of fan means. As such, the light 10 is effectively cooled by the radiation of heat from top 18 without allowing contaminants to enter light 10 thereby protecting the surgical site and also the optical components.

As discussed above, the cooling function of the present apparatus functions most efficiently when the light 10 is oriented vertically. However, it will be understood that the heat flow principles of the instant invention are effective when the light 10 is oriented other than vertically. In such orientations, the heat will be removed from the system but not as symmetrically as when it is in the vertical orientation.

It will be understood that various changes in the details, materials and arrangements of parts which have been herein described and illustrated in order to explain the nature of the invention may be made by those skilled in the art within the principles and scope of the invention as expressed in the appended claims.

What is claimed is:

1. Apparatus for cooling an enclosure having a top, a bottom and sides extending therebetween and a heat generating means centrally disposed within said enclosure with one end thereof in proximity to said top of said enclosure and having a closed second end portion and side portions, comprising:

a. a series of fins affixed to the side portions of said heat generating means between said end portions thereof; and, b. an inner annular wall disposed within said enclosure and extending at its upper end from a first point adjacent the radial, ends of said fins and near yet spaced from said top of said enclosure, so as to define an air flow passage between said side portion of said heat generating means, said fins and said upper end of said inner annular wall, to a second point at which its lower end is in proximity to the juncture between said sides and said bottom of said enclosure, said inner annular wall being provided with a series of slots disposed about the circumference thereof adjacent said second point.

2. Apparatus of claim 1 in which said inner annular wall is configured such that the space between the upper surface of said inner annular wall and the lower surface of said top of said enclosure increases as the distance from the center of said enclosure increases.

3. Apparatus of claim 2 in which said inner annular wall is concave relative to said bottom of said enclosure and is curved at a first radius of curvature.

4. Apparatus of claim 3 in which said top of said enclosure is concave relative to said bottom of said enclosure at a radius of curvature greater than said first radius of curvature.

5. Apparatus of claim 4 in which said sides of said enclosure generally form a cylindrical shape.

6. Apparatus of claim 5 in which the side portions of said heat generating means generally form a cylindrical shape.

7. Apparatus of claim 6 in which said fins are equally spaced about the side portions of said heat generating means.

8. Apparatus of claim 7 in which certain of said fins further comprise radially extending arm portions extending from the radial ends of said certain fins to said first point.

9. Apparatus for cooling a surgical light having a surrounding enclosure which includes a top cover, a bottom lens and side cover means extending therebetween and which surrounds a series of lamps disposed within a lamp housing mounted with one end thereof central to and adjacent said top cover and including a closed second end and side portions, comprising:

a. a series of vertical fins affixed to the side portions of said lamp housing; and, b. an inner reflector forming an annular wall disposed within said enclosure and extending at its upper end from a first point adjacent the radial ends of said fins and in proximity to yet spaced from said top of said enclosure, so as to define an air flow passage between said side portions of said lamp housing, said fins and said upper ends of said reflector, to a second point at which its lower end is in proximity to the juncture between said sides and said bottom of said enclosure, said reflector being provided with a series of slots disposed about the circumference thereof adjacent said second point.

10. Apparatus of claim 9 in which said reflector is configured such that the space between the upper surface of said reflector and the lower surface of said top cover increases as the distance from the center of said enclosure increases.

11. Apparatus of claim 10 in which said reflector is concave relative to said lens and is curved at a first radius of curvature.

12. Apparatus of claim 11 in which said top cover is concave relative to said lens at a radius of curvature greater than said first radius of curvature.

13. Apparatus of claim 12 in which said side cover of said enclosure generally forms a cylindrical shape.

14. Apparatus of claim 13 in which the side portions of said lamp housing generally form a cylindrical shape.

15. Apparatus of claim 14 in which said fins are equally spaced about the side portions of said lamp housing.

16. Apparatus of claim 15 in which certain of said fins further comprise radially extending arm portions extending from the radial ends of said certain fins to said first point.

* * * * *

UNITED STATES PATENT AND TRADEMARK OFFICE

CERTIFICATE OF CORRECTION

PATENT NO. : 4,600,979

DATED : July 15, 1986

INVENTOR(S) : Kenneth J. Fisher and William R. Miller

It is certified that error appears in the above—identified patent and that said Letters Patent is hereby corrected as shown below:

Col. 2, line 6, delete "the," and substitute therefor --the--; and,

Col. 5, line 54, delete "radial," and substitute therefor --radial--.

Signed and Sealed this

Sixteenth Day of December, 1986

*Attest:*

DONALD J. QUIGG

*Attesting Officer* *Commissioner of Patents and Trademarks*